US011989027B2

(12) United States Patent
Burkhart et al.

(10) Patent No.: US 11,989,027 B2
(45) Date of Patent: May 21, 2024

(54) DUAL-MODE AUTONOMOUS GUIDED VEHICLE

(71) Applicant: Lam Research Corporation, Fremont, CA (US)

(72) Inventors: Christopher W. Burkhart, Los Gatos, CA (US); Charles Ditmore, Oakland, CA (US)

(73) Assignee: Lam Research Corporation, Fremont, CA (US)

( * ) Notice: Subject to any disclaimer, the term of this patent is extended or adjusted under 35 U.S.C. 154(b) by 785 days.

(21) Appl. No.: 17/046,257

(22) PCT Filed: Apr. 9, 2019

(86) PCT No.: PCT/US2019/026623
§ 371 (c)(1),
(2) Date: Oct. 8, 2020

(87) PCT Pub. No.: WO2019/199856
PCT Pub. Date: Oct. 17, 2019

(65) Prior Publication Data
US 2021/0080968 A1 Mar. 18, 2021

Related U.S. Application Data

(60) Provisional application No. 62/655,026, filed on Apr. 9, 2018.

(51) Int. Cl.
*G05D 1/02* (2020.01)
*G05D 1/00* (2006.01)

(52) U.S. Cl.
CPC ......... *G05D 1/0225* (2013.01); *G05D 1/0234* (2013.01); *G05D 2201/0216* (2013.01)

(58) Field of Classification Search
CPC ............... G05D 1/0225; G05D 1/0234; G05D 2201/0216; G05D 1/0282; G05D 1/0268; G05D 1/0272; G05B 19/41895
See application file for complete search history.

(56) References Cited

U.S. PATENT DOCUMENTS

2002/0025244 A1* 2/2002 Kim .................. H01L 21/67775
414/217
2006/0154385 A1 7/2006 Aggarwal
(Continued)

FOREIGN PATENT DOCUMENTS

| CN | 102341322 | 2/2012 |
| CN | 204856210 | 12/2015 |

(Continued)

OTHER PUBLICATIONS

International Application Serial No. PCT/US2019/026623, International Search Report dated Jul. 31, 2019, 3 pgs.
(Continued)

*Primary Examiner* — Peter D Nolan
*Assistant Examiner* — Demetra R Smith-Stewart
(74) *Attorney, Agent, or Firm* — Schwegman Lundberg & Woessner, P.A.

(57) ABSTRACT

In some examples, a dual-mode autonomous guided vehicle (AGV) is provided for docking a module in a fabrication bay. An example AGV may comprise a chassis for supporting the module on the AGV; drive means to transport the AGV under autonomous guidance, in a module transportation mode, to a specified location within the fabrication bay; a Cartesian x-y movement table to move the module under autonomous guidance, in a module docking mode, in an x- or y-docking direction, into a specific docking position; and a z-direction lift mechanism to move the module in a z-docking direction during the module docking mode.

14 Claims, 2 Drawing Sheets

(56) References Cited

U.S. PATENT DOCUMENTS

| | | | | |
|---|---|---|---|---|
| 2006/0188360 A1* | 8/2006 | Bonora | ............ | H01L 21/67736 |
| | | | | 414/217.1 |
| 2011/0099788 A1 | 5/2011 | Kilibarda | | |
| 2011/0314665 A1 | 12/2011 | Kilibarda | | |
| 2012/0321423 A1* | 12/2012 | MacKnight | ....... | H01L 21/67276 |
| | | | | 414/664 |
| 2015/0316925 A1 | 11/2015 | Frisk | | |
| 2015/0367930 A1 | 12/2015 | Attucci et al. | | |
| 2017/0248961 A1* | 8/2017 | Pfaff | ....................... | G05D 1/024 |
| 2017/0344009 A1* | 11/2017 | Wernersbach | ....... | G05D 1/0011 |

FOREIGN PATENT DOCUMENTS

| | | | | | |
|---|---|---|---|---|---|
| CN | 106843218 | | 6/2017 | | |
| CN | 111971634 | | 11/2020 | | |
| GB | 2362373 | A * | 11/2001 | ....... | H01L 21/67775 |
| JP | H06267819 | | 9/1994 | | |
| WO | WO-2006091593 | A2 * | 8/2006 | ....... | H01L 21/67736 |

OTHER PUBLICATIONS

International Application Serial No. PCT/US2019/026623, Written Opinion dated Jul. 31, 2019, 5 pgs.

"International Application Serial No. PCT US2019 026623, International Preliminary Report on Patentability dated Oct. 22, 2020", 7 pgs.

"Chinese Application Serial No. 201980024871.8, Office Action mailed Dec. 28, 2023", w machine English Translation, 16 pgs.

Korean Application Serial No. 10-2020-7032239, Notice of Preliminary Rejection mailed Mar. 29, 2024, w/ English translation, 12 pgs.

\* cited by examiner

DUAL-MODE AUTONOMOUS GUIDED VEHICLE

CLAIM OF PRIORITY

This application is a U.S. National Stage Filing under 35 U.S.C. 371 from International Application No. PCT/US2019/026623, filed on Apr. 9, 2019, and published as WO 2019/199856 A1 on Oct. 17, 2019, which claims the benefit of priority to Burkhart et al, U.S. Provisional Application No. 62/655,026, filed. Apr. 9, 2018, entitled "AUTONOMOUS GUIDED VEHICLE FOR SEMICONDUCTOR EQUIPMENT TRANSPORTATION AND DOCKING", each of which is incorporated herein by reference in its entirety.

FIELD

The present disclosure relates generally to a dual-mode autonomous guided vehicle (AGV) and, in particular, to an AGV for semiconductor equipment transportation and docking in a semiconductor fabrication bay. In one example, an AGV is provided for moving and docking equipment modules.

BACKGROUND

Conventionally in the semiconductor manufacturing industry, the movement of wafer manufacturing or processing modules inside a fabrication area (also termed a "fab bay") has been done manually. As these modules often need to be aligned very precisely with respect to one another, the manual maneuvering and exact alignment of them can be very challenging particularly under the time pressures of modern day manufacturing schedules.

For example, in the case of vacuum cluster tools such as deposition or etch process tools, a vacuum wafer transfer module (VTM) is typically set in place before the process modules are installed. As each process module is moved into a wafer fab bay, it is usually required to be positioned very carefully and precisely in relation to another module using x, y, and z coordinates and a theta (rotation) component, such that ports on the process module and the VTM are precisely aligned. Typically, once certain alignment pins and mating holes at the ports are aligned, the process module can be pushed into full contact with the VTM chamber and affixed thereto such that a vacuum tight seal between the two modules is made. While this movement and alignment work can be facilitated using casters, air skids, lift trucks, hoists, and so forth, the movement and final alignment operations can still be very repetitive and costly in terms of time and money, especially in view of the degree of docking precision required.

The present inventors seek to address these drawbacks. It should be noted that the information described in this section is to provide the skilled artisan with some context for the following disclosed subject matter and should not be considered as admitted prior art.

SUMMARY

In some examples, a dual-mode autonomous guided vehicle (AGV) is provided for docking a module in a fabrication bay. An example AGV may comprise a chassis for supporting the module on the AGV; drive means to transport the AGV under autonomous guidance, in a module transportation mode, to a specified location within the fabrication bay; a Cartesian x-y movement table to move the module under autonomous guidance, in a module docking mode, in an x- or y-docking direction, into a specific docking position; and a z-direction lift mechanism to move the module in a z-docking direction during the module docking mode.

DESCRIPTION OF THE DRAWINGS

Some embodiments are illustrated by way of example and not limitation in the views of the accompanying drawing.

DESCRIPTION

Figure 1:
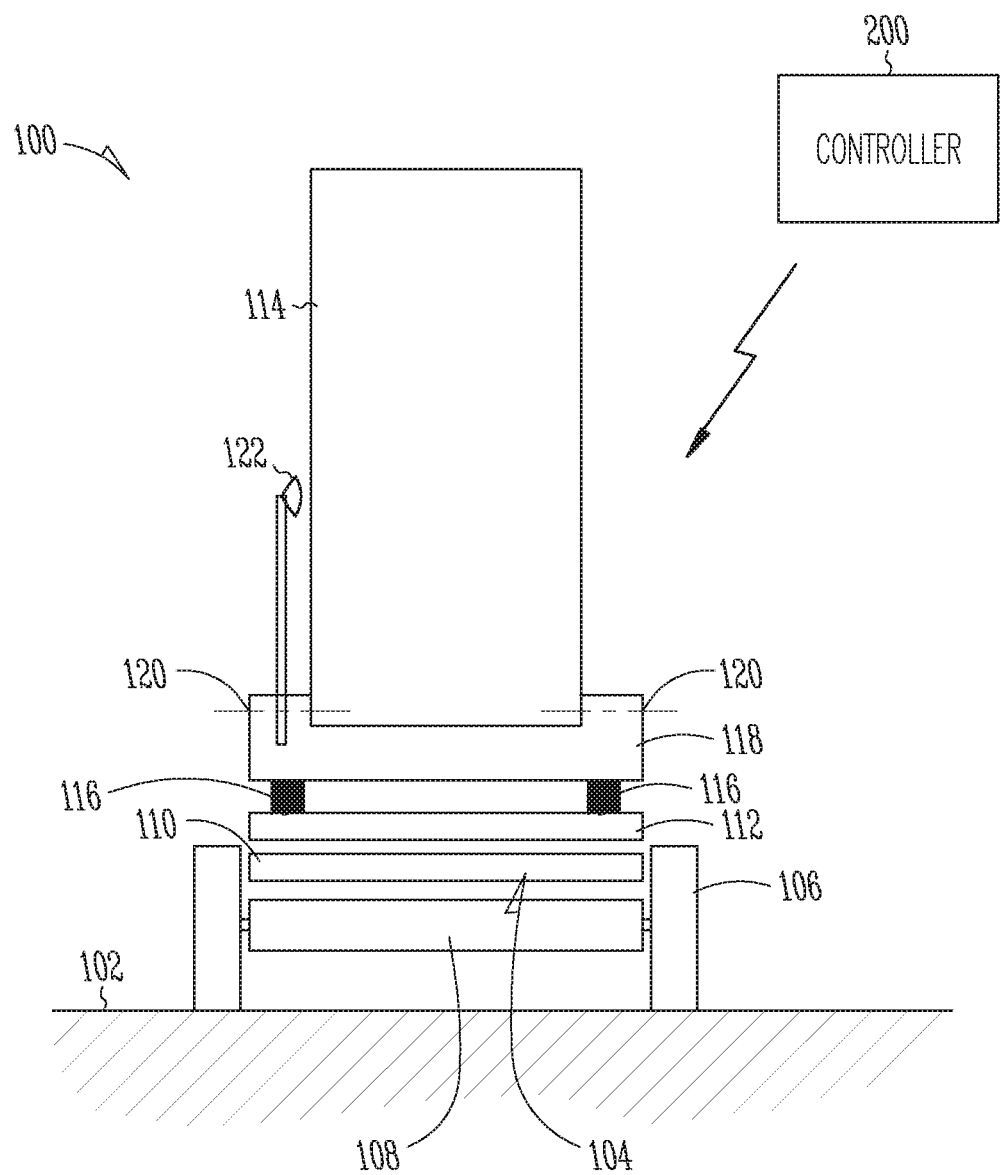
FIG. 1 is a conceptual front schematic view of a semiconductor equipment transportation and docking vehicle, according to an example embodiment.

The description that follows includes systems, methods, techniques, instruction sequences, and computing machine program products that embody illustrative embodiments of the present disclosure. In the following description, for purposes of explanation, numerous specific details are set forth in order to provide a thorough understanding of example embodiments. It will be evident, however, to one skilled in the art that the present disclosure may be practiced without these specific details.

A portion of the disclosure of this patent document contains material that may be subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to any data as described below and in the drawings that form a part of this document: Copyright Lam Research Corporation, 2018-2019, All Rights Reserved.

As mentioned above, in semiconductor fabrication facilities (fab bays) it is typical for human operators to transport process modules and other wafer processing or inspection modules manually from one location to another (for example, from a fab's de-trash area to a designated equipment bay). Modules are generally very heavy items. Once a module is positioned generally within a bay, an operator will then typically maneuver the module by hand into a precisely specified position for docking operations. For process modules that are to be docked to a transfer module, for example, this precision step requires deft and careful handling and adjustment of module positions in x, y, z, and theta (rotational) directions. This need for careful positioning can present a significant production challenge and inject delay into production schedules.

In FIG. 1, a front schematic view is provided of a dual-mode autonomous guided vehicle 100, according to the present disclosure. The vehicle is also termed an autonomous guided vehicle and will be referred to herein as an AGV 100.

The AGV is generally configured to work in confined locations. Space just adjacent the AGV may in use be very restricted. In some examples, the AGV is narrow in relation to its length and configured to fit within the contours of a fab bay in which it is intended to be used. The narrow configuration of the AGV allows various other process modules (PMs) to be positioned on either side of a process module being installed by the AGV 100. Moreover, for stability or limited overhead space reasons, a PM may need to ride very close to a fab floor when being installed. The AGV is configured to provide this functionality.

In the example AGV 100 shown in FIG. 1, the AGV load (e.g. a PM 114) is supported directly above the AGV 100. In other examples, an AGV 100 may have an overall configuration akin to a forklift truck, such that load positioning mechanisms are not placed directly under the AGV load but are supported laterally of the AGV with counterweights (including, for example, batteries) positioned on the opposite end of the AGV. The illustrated AGV 100 can move autonomously over the floor 102 of a fabrication bay without human power or control. The AGV 100 has a chassis 104 supported and powered by wheels or tracks 106. The wheels 106 in this case provide propulsion and allow turning at one or both ends of the AGV 100 (i.e. double-ended steering, and/or all-wheel drive). In the illustrated example AGV 100, an axle 108 extends between the two illustrated wheels 106. A turning wheel 106 is provided at each end of the axle 108. The turning wheels 106 may be powered by one or more electric or hydraulic motors to provide linear and rotational movement. Other power and turning arrangements, such as a turning axle, are possible.

The chassis 104 includes a deck 110 which supports a Cartesian x-y movement table 112. In one example embodiment, the Cartesian x-y movement table 112 has fine motor control to impart precise movement to an object supported by the deck 110. Such controlled fine movement can be employed when docking a semiconductor module, such as the semiconductor manufacturing module 114 carried by the AGV 100. The semiconductor manufacturing module 114 may be docked to a transfer module, for example, by the AGV 100 in a "module docking" mode or phase. The module docking mode may include fine, precise movements imparted by the Cartesian x-y movement table 112 and comprise active operations in an overall module installation sequence that includes module transportation and module docking phases, for example. The AGV may adopt respective module transportation and module docking modes during these phases.

In some examples, the Cartesian x-y movement table 112 is rotatable on the AGV 100. The table 112 is controllably rotatable by an index motor (not shown) capable of imparting fine increments of rotational movement to the table 112. Precise increments of movement in a theta direction (i.e. rotation, and counter-rotation) can be imparted to the Cartesian table during a module docking or a module transportation phase, for example. In other arrangements, one or servo motors may be used.

A z-direction component to a module docking phase or mode can be provided by a lift (or tilt) mechanism 116 positioned, in some examples, between the Cartesian x-y movement table 112 and a load bed 118. Other arrangements are possible. The load bed 118 carries the semiconductor manufacturing module 114 and secures it thereto by means of module-securing clamps or bolts 120. For convenience, some module-securing bolts may pass through holes or channels in the load bed 118. Active operations in a module docking phase may be supplemented simultaneously or sequentially by very fine, precise movements imparted by the lift mechanism 116 in the z-direction. The x, y, z and theta movements imparted by the components just described can occur mutually independently, simultaneously or sequentially under action of a controller or machine 200 described further below.

The AGV 100 has two (or dual) modes of operation. In an AGV "transportation" mode in a module transport phase, a semiconductor manufacturing module 114 can be brought into a fabrication bay and generally located at a specified location there using (relatively) coarse planar movements imparted by the powered wheels 106 and the axle 108, for example. Once driven to a specified location within a bay, for example adjacent a VTM chamber, the wheels 106 of the AGV 100 are locked and the AGV 100 provides a stable foundation for commencement of the "module docking" phase mentioned above. In a "module docking" mode, (relatively) fine movements in the x, y, z and theta directions are imparted to the module 114 by the rotatable Cartesian x-y movement table 112 and the lift mechanism 116 to move the module 114 to a specific docking position autonomously. At that specific docking location, the module 114 can be docked securely to the VTM chamber. The autonomous movement to the specified location in the fab bay, and the specific docking location, may reduce an otherwise significant risk of human injury as discussed above.

In some examples, to guide such fine movements, sensors or cameras 122 on the AGV 100 monitor fiducials or locating features on the VTM chamber and provide observation data that is used by the controller 200 to instruct the table 112 and lift mechanism 116 and guide the semiconductor manufacturing module 114 into the exact docking position required. In one example, deployable tool drivers are fitted to the AGV 100. Once a semiconductor manufacturing module 114 has been docked, one or more tool drivers operate to install and torque interconnecting mounting bolts in a pre-specified pattern and to required torque values. Other fasteners or clamps can be used. The mounting bolts, fasteners or clamps may be installed manually, or automatically.

In one example, the AGV 100 or controller 200 is taught by machine learning the path from one location to another, such as, for example, a de-trash area to a particular bay. In some examples, after the semiconductor manufacturing module 114 has been delivered and docked, the AGV 100 returns on its own to the de-trash area by following the learned path in reverse.

In other examples, a path for an AGV 100 from its initial loading point to inside the semiconductor tool bay (fab bay) may be defined by lines (for example, tape), targets, or other fiducials that are applied to the floor as defined by general move-in and/or installation procedures, or as defined by tool facility templates that delimit floor cut-outs within the tool bay area. In some examples, separate sets of lines, targets, or other fiducials may be used for navigation of the front and rear of the AGV 100 such that the wheels 106 avoid all floor cutouts and the cargo (e.g. a PM) is presented in the approximate orientation required for docking.

In some examples, the AGV 100 is configured for a type and/or unit number of a cargo (e.g. a PM) loaded thereon. The details of a loaded cargo may be entered into a processor manually by an operator or may be determined automatically using onboard sensors, such that the AGV 100 follows an appropriate set of lines, targets, or other fiducials for a specific cargo once the AGV 100 arrives in the general vicinity of a semiconductor tool bay.

In some examples, the AGV 100 is equipped with cameras and sensors to provide obstacle and personnel avoidance functionality, and accelerometers to assist in optimizing transportation velocities and acceleration for fast but safe delivery. This optimization can reduce tipping hazards and potentially damaging accelerations when driving over floor thresholds and joints, for example. Some example AGVs 100 can sense and avoid missing floor tiles, overhead and side obstacles, and fabrication personnel, for example.

In some examples, an unloaded AGV 100 can collapse or contract in length, width and/or height for shipping purposes, or to allow a contracted AGV 100 to move around a loaded AGV 100 disposed in a narrow fab corridor in a situation where more than one AGV 100 is in operation, for example.

Thus, in some examples there is provided A dual-mode autonomous guided vehicle (AGV) for docking a module in a fabrication bay, the AGV comprising: a chassis for supporting the module on the AGV; drive means to transport the AGV under autonomous guidance, in a module transportation mode, to a specified location within the fabrication bay; a Cartesian x-y movement table to move the module under autonomous guidance, in a module docking mode, in an x- or y-docking direction, into a specific docking position; and a z-direction lift mechanism to move the module in a z-docking direction during the module docking mode.

In some examples, the Cartesian x-y movement table can operate independently of the drive means.

In some examples, the z-direction lift mechanism can operate independently of the drive means and the Cartesian x-y movement table.

In some examples, the Cartesian x-y movement table, in the module docking mode, restricts movement of the module outward of a docking zone.

In some examples, the specified location of the AGV in the fabrication bay and the specific docking position are both within the docking zone.

In some examples, the specified location of the AGV in the fabrication bay is outside the docking zone and wherein the specific docking position is within the docking zone, and wherein the Cartesian x-y movement table is configured to move the module autonomously into the docking zone and to the specific docking position.

In some examples, the Cartesian x-y movement table is rotatable on the AGV to impart rotational movement to the module in the module transportation and module docking modes.

In some examples, the AGV further comprises an index motor to rotate the Cartesian x-y movement table in specified rotational increments.

In some examples, the AGV further comprises a tilt device to move a surface of the module out of an x-y plane initially defined by the Cartesian x-v table.

In some examples, the drive means, the Cartesian x-y movement table, the index motor, the lift mechanism, and the tilt device can operate simultaneously and independently of each other in the module transportation and module docking modes.

In some examples, the AGV further includes at least one AGV sensor to detect or communicate with an external fiducial or location feature of the fabrication bay. In some examples, the at least one AGV sensor collects observation data in the module transportation and module docking modes and communicates the observation data to an external controller.

In some examples, the AGV receives from the external controller navigation commands based on the observation data to guide the AGV autonomously in the module transportation and module docking modes.

In some examples, the external controller is machine-trained based on the observation data to construct a module transportation and module docking path to direct the module to the specific docking position.

In some examples, the AGV further comprises a tool driver tool to dock the module with other equipment at the specific docking position.

Figure 2:
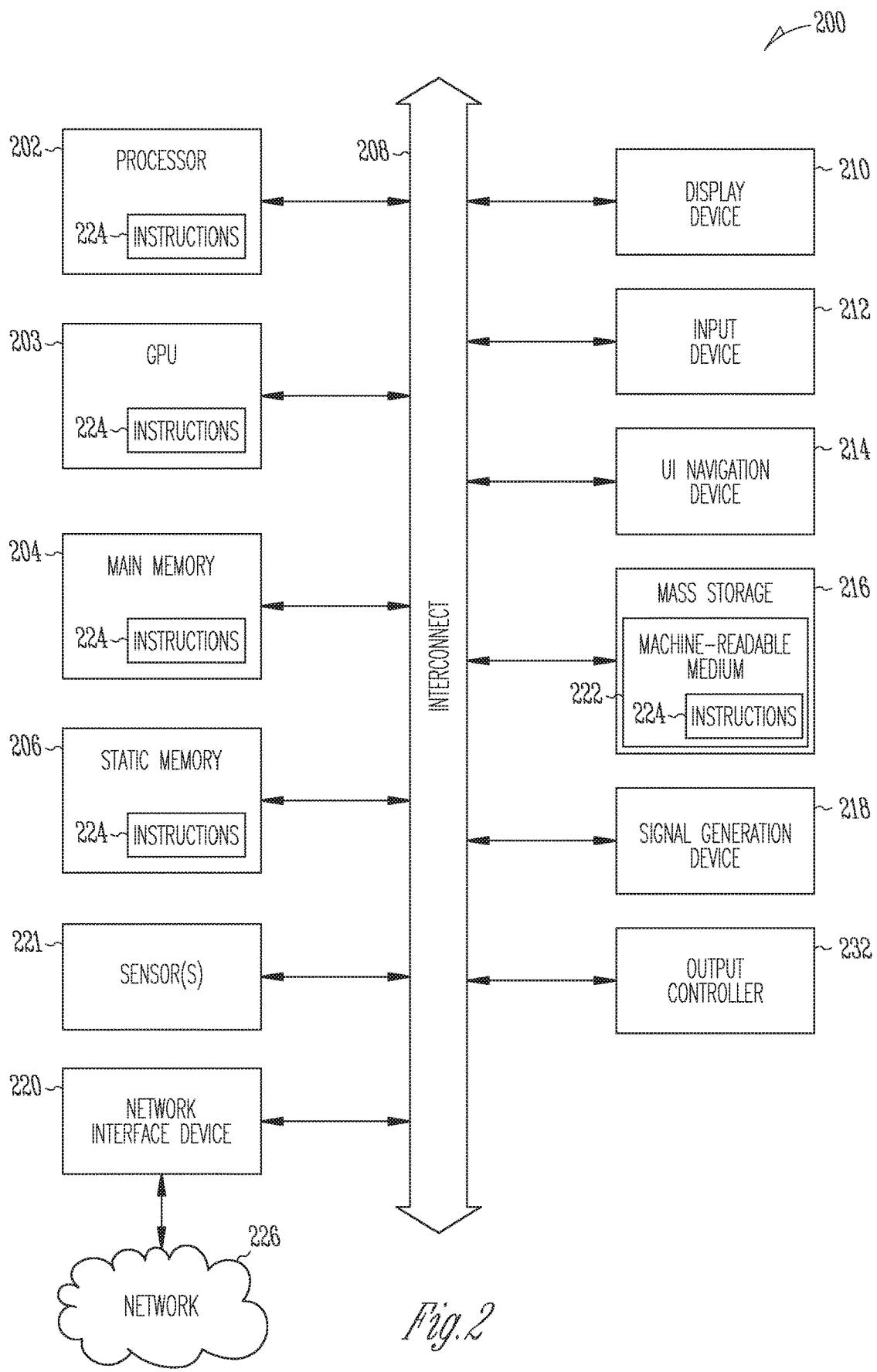
FIG. 2 is a block diagram illustrating an example of a machine or controller to guide an AGV, or upon which one or more example methods may be implemented or controlled, according to various embodiments.

FIG. 2 is a block diagram illustrating an example of a controller or machine 200 by which an AGV 100 as well as one or more example methods described herein may be controlled. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in a peer-to-peer (P2P) (or other distributed) network environment. Further, while only a single machine 200 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, several components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 200 may include a hardware processor 202 (e.g., a central processing unit (CPU), a hardware processor core, or any combination thereof), a graphics processing unit (GPU) 203, a main memory 204, and a static memory 206, some or all of which may communicate with each other via an interlink (e.g., bus) 208. The machine 200 may further include a display device 210, an alphanumeric input device 212 (e.g., a keyboard), and a user interface (UI) navigation device 214 (e.g., a mouse). In an example, the display device 210, alphanumeric input device 212, and UI navigation device 214 may be a touch screen display. The machine 200 may additionally include a mass storage device (e.g., drive unit) 216, a signal generation device 218 (e.g., a speaker), a network interface device 220, and one or more sensors 221, such as a Global Positioning System (GPS) sensor, compass, accelerometer, or another sensor. The machine 200 may include an output controller 228, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The mass storage device 216 may include a machine-readable medium 222 on which is stored one or more sets of data structures or instructions 224 (e.g., software) embodying or utilized by any one or more of the techniques or functions described herein. The instructions 224 may also reside, completely or at least partially, within the main memory 204, within the static memory 206, within the hardware processor 202, or within the GPU 203 during execution thereof by the machine 200. In an example, one or any combination of the hardware processor 202, the GPU 203, the main memory 204, the static memory 206, or the mass storage device 216 may constitute machine-readable media.

While the machine-readable medium 222 is illustrated as a single medium, the term "machine-readable medium" may include a single medium, or multiple media (e.g., a centralized or distributed database, and/or associated caches and servers) configured to store the one or more instructions 224.

The term "machine-readable medium" may include any medium that is capable of storing, encoding, or carrying instructions 224 for execution by the machine 200 and that cause the machine 200 to perform any one or more of the techniques of the present disclosure, or that is capable of storing, encoding, or carrying data structures used by or associated with such instructions 224. Non-limiting machine-readable medium examples may include solid-state memories, and optical and magnetic media. In an example, a massed machine-readable medium comprises a machine-readable medium 222 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks. The instructions 224 may further be transmitted or received over a communications network 226 using a transmission medium via the network interface device 220.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A dual-mode autonomous guided vehicle (AGV) for docking a module in a fabrication bay, the AGV comprising:
a chassis for supporting the module on the AGV;
drive means to transport the AGV under autonomous guidance, in a module transportation mode, to a specified location within the fabrication bay;
a Cartesian x-y movement table to move the module under autonomous guidance, in a module docking mode, in an x- or y-docking direction, into a specific docking position, wherein the Cartesian x-y movement table, in the module docking mode, restricts movement of the module outward of a docking zone; and
a z-direction lift mechanism to move the module in a z-docking direction during the module docking mode.

2. The AGV of claim 1, wherein the Cartesian x-y movement table can operate independently of the drive means.

3. The AGV of claim 1, wherein the z-direction lift mechanism can operate independently of the drive means and the Cartesian x-y movement table.

4. The AGV of claim 1, wherein the specified location of the AGV in the fabrication bay and the specific docking position are both within the docking zone.

5. The AGV of claim 1, wherein the specified location of the AGV in the fabrication bay is outside the docking zone and wherein the specific docking position is within the docking zone, and wherein the Cartesian x-y movement table is configured to move the module autonomously into the docking zone and to the specific docking position.

6. The AGV of claim 1, wherein the Cartesian x-y movement table is rotatable on the AGV to impart rotational movement to the module in the module transportation and module docking modes.

7. The AGV of claim 6, further comprising an index motor to rotate the Cartesian x-y movement table in specified rotational increments.

8. The AGV of claim 7, further comprising a tilt device to move a surface of the module out of an x-y plane initially defined by the Cartesian x-y movement table.

9. The AGV of claim 8, wherein the drive means, the Cartesian x-y movement table, the index motor, the z-direction lift mechanism, and the tilt device can operate simultaneously and independently of each other in the module transportation and module docking modes.

10. The AGV of claim 1, further comprising at least one AGV sensor to detect or communicate with an external fiducial or location feature of the fabrication bay.

11. The AGV of claim 10, wherein the at least one AGV sensor collects observation data in the module transportation and module docking modes and communicates the observation data to an external controller.

12. The AGV of claim 11, wherein the AGV receives, from the external controller, navigation commands based on the observation data to guide the AGV autonomously in the module transportation and module docking modes.

13. The AGV of claim 12, wherein the external controller is machine-trained based on the observation data to construct a module transportation and module docking path to direct the module to the specific docking position.

14. The AGV of claim 1, further comprising a tool driver tool to dock the module with other equipment at the specific docking position.

* * * * *